US 6,323,872 B1

(12) United States Patent
Wozniak

(10) Patent No.: US 6,323,872 B1
(45) Date of Patent: Nov. 27, 2001

(54) PROCESS FOR CONVERTING THE REPRESENTATION OF A VIDEO IMAGE BETWEEN TWO CODING SYSTEMS

(75) Inventor: Andrzej Wozniak, Palaiseau (FR)

(73) Assignees: Bull S.A., Louveciennes; Inria, Chesnay, both of (FR)

(*) Notice: Subject to any disclaimer, the term of this patent is extended or adjusted under 35 U.S.C. 154(b) by 0 days.

(21) Appl. No.: 09/235,294

(22) Filed: Jan. 22, 1999

(30) Foreign Application Priority Data

Jan. 23, 1998 (FR) .................................................. 98 00954

(51) Int. Cl.[7] .................................................. G09G 5/04
(52) U.S. Cl. .................................................. 345/603; 345/605
(58) Field of Search .................................. 345/434, 433, 345/154, 155, 153, 435, 136, 139; 348/394.1, 661, 659, 660; 382/167; 341/67; 375/240.25

(56) References Cited

U.S. PATENT DOCUMENTS

| | | | | |
|---|---|---|---|---|
| 5,124,688 | * | 6/1992 | Rumball | 345/154 |
| 5,150,206 | * | 9/1992 | Roberts | 348/661 |
| 5,504,821 | * | 4/1996 | Kanamori et al. | 382/167 |
| 5,510,852 | * | 4/1996 | Shyu | 348/660 |
| 5,541,658 | * | 7/1996 | Ishiwata | 348/394.1 |
| 5,841,422 | * | 11/1998 | Shyu | 345/154 |

FOREIGN PATENT DOCUMENTS

| | | |
|---|---|---|
| 0551773 | 7/1993 | (EP) . |
| 0680223 | 11/1995 | (EP) . |
| 2670593 | 6/1992 | (FR) . |

* cited by examiner

Primary Examiner—Matthew Luu
Assistant Examiner—Thu-Thao Havan

(57) ABSTRACT

The present invention relates to a process for converting the representation of a video image between two coding systems with the aid of two respective sets of parameters, in which each set of parameters is deduced from the other by means of a matrix transformation. For each parameter of the set to be converted from the first coding system to the second coding system, a breakdown (11A, 11B, 11C; 12A, 12B, 12C) is selected in the parameters of the second coding system representing the value of the parameter in the matrix transformation. The breakdowns of each of the parameters to be converted are added and may then be shifted and reorganized. Each of the parameters of the two coding systems have ranges of authorized values. In the conversion process, the values of the parameters to be converted and/or the values of the converted parameters that are outside the corresponding ranges of values are clipped.

22 Claims, 4 Drawing Sheets

US 6,323,872 B1

PROCESS FOR CONVERTING THE REPRESENTATION OF A VIDEO IMAGE BETWEEN TWO CODING SYSTEMS

BACKGROUND OF THE INVENTION

1. Field of the Invention

The present invention relates to a process for converting the representation of a video image between two coding systems. More specifically, the invention relates to a process that makes it possible to convert the representation of a video image between two coding systems in which the two respective sets of parameters are deduced from one another by means of a matrix transformation.

The invention can be applied, for example, to the conversion of images between the RGB and YCbCr standards.

2. Description of the Related Art

When an image is sent through a network, for example of the Internet type, the image can be compressed by an algorithm in accordance with ITU standard H261. The image is coded according to the YCbCr coding system (Y=luminance, Cr=the difference between the red component and the luminance, Cb=the difference between the blue component and the luminance) defined in recommendation 601 of the CCIR (International Radio Consultative Committee). When the image is retrieved in an operating system, for example of the "WINDOWS" type, the image is coded according to the RGB standard (R=red, G=green, B=blue). The two sets of parameters of the two coding systems are deduced from one another by means of a matrix transformation. Thus, the conversion of the parameters from one coding system to the other requires, for each pixel of the image, a number of calculations that are very costly in terms of machine time.

SUMMARY OF THE INVENTION

A first object of the invention is to offer a process for converting the representation of a video image between two coding systems that reduces the number of processing operations during the conversion of the image.

This object is achieved because of the fact that the process for converting the representation of a video image between two coding systems with the aid of two respective sets of parameters, each of which sets of parameters is deduced from the other by means of a matrix transformation, is characterized in that it comprises:

a step comprised of selecting, for each parameter in the set to be converted from the first coding system to the second coding system, a breakdown in the parameters of the second coding system representing the value of the parameter in the matrix transformation, and a step comprised of adding the breakdowns of each of the parameters to be converted.

According to another characteristic of the process, each of the parameters of the two coding systems have ranges of authorized values, and the conversion process includes a step comprised of clipping the values of the parameters to be converted and/or the values of the converted parameters that are outside the corresponding ranges of authorized values.

According to still another characteristic of the process, each breakdown in the parameters of the second coding system is selected by addressing a stored conversion table with the aid of the input value of the parameter in question.

According to yet another characteristic of the process, the addition operation is followed by a step for shifting and reorganizing the result.

According to still another characteristic, the breakdowns in the parameters of the second coding system are constituted by words having the same bit size, the values of the parameters of the second coding system of the breakdown being located in adjacent bit ranges and possibly being separated by at least one protection bit for preventing the propagation of the carry resulting from the additions.

According to another characteristic of the process, the values of the parameters of the second coding system of the breakdown have bit sizes greater than the sizes of the coded values at the end of the conversion, both in the low-order bits for increasing the precision of the calculations and in the high-order bits for accommodating the overflow. The step comprised of adding the breakdowns of each of the parameters to be converted is followed by a step comprised of extracting the bit ranges representing the values of the parameters of the second coding system, in order to eliminate the precision bits, the carry bits and the overflow bits.

According to another characteristic of the process, the process for converting the representation of a video image between two coding systems is used to convert an image from the RGB standard to the YCbCr standard and vice versa.

According to another characteristic, the process for converting the representation of a video image between two coding systems comprises a step for clipping the values of the parameters of the breakdown constituting the converted parameter, the clipping step being comprised of replacing the values that are lower than the lower limit of the range of authorized values with the lower limit value, and of replacing the values that are higher than the upper limit of the range of authorized values with the upper limit value.

According to another characteristic, the clipping step is carried out either directly in the conversion tables or by a program.

According to another characteristic, each breakdown is constituted by a 32-bit word, each conversion table associated with a parameter to be converted (R, G, B), respectively (Y, Cr, Cb) comprising at least 256 words or breakdowns corresponding to the possible values of the parameters to be converted.

According to another characteristic, for the conversion of the parameters (R, G, B) into parameters (Y, Cr, Cb), the breakdowns of the parameters (R, G, B) each comprise a first range of N1 bits representing the corresponding value of the parameter (Y), or luminance, a second range of N2 bits representing the corresponding value of the parameter (Cb), or the difference between the luminance and the blue chrominance, and a third range of N3 bits representing the value corresponding to the parameter (Cr) or the difference between the luminance and the red chrominance.

According to another characteristic, all of the ranges comprise additional bits for increasing precision.

According to another characteristic, for the conversion of the parameters (Y, Cr, Cb) into parameters (R, G, B), the breakdowns of the parameters (Y, Cr, Cb) comprise a range of M1 bits representing the corresponding value of the parameter (R), or the color red, a range of M2 bits representing the corresponding value of the parameter (B), or the color blue, and a range of M3 bits representing the corresponding value of the parameter (G), or the color green, each of the bit ranges representing values of the parameters R and B comprising 1 bit provided for protection against the propagation of the carry, all of the ranges having at least 1 bit for increasing precision and 1 overflow bit.

BRIEF DESCRIPTION OF THE DRAWINGS

Other characteristics and advantages of the present invention will emerge more clearly from the reading of the following description of a non-limiting example given in reference to the appended drawings, in which.

DESCRIPTION OF THE PREFERRED EMBODIMENTS

Figure 1A:
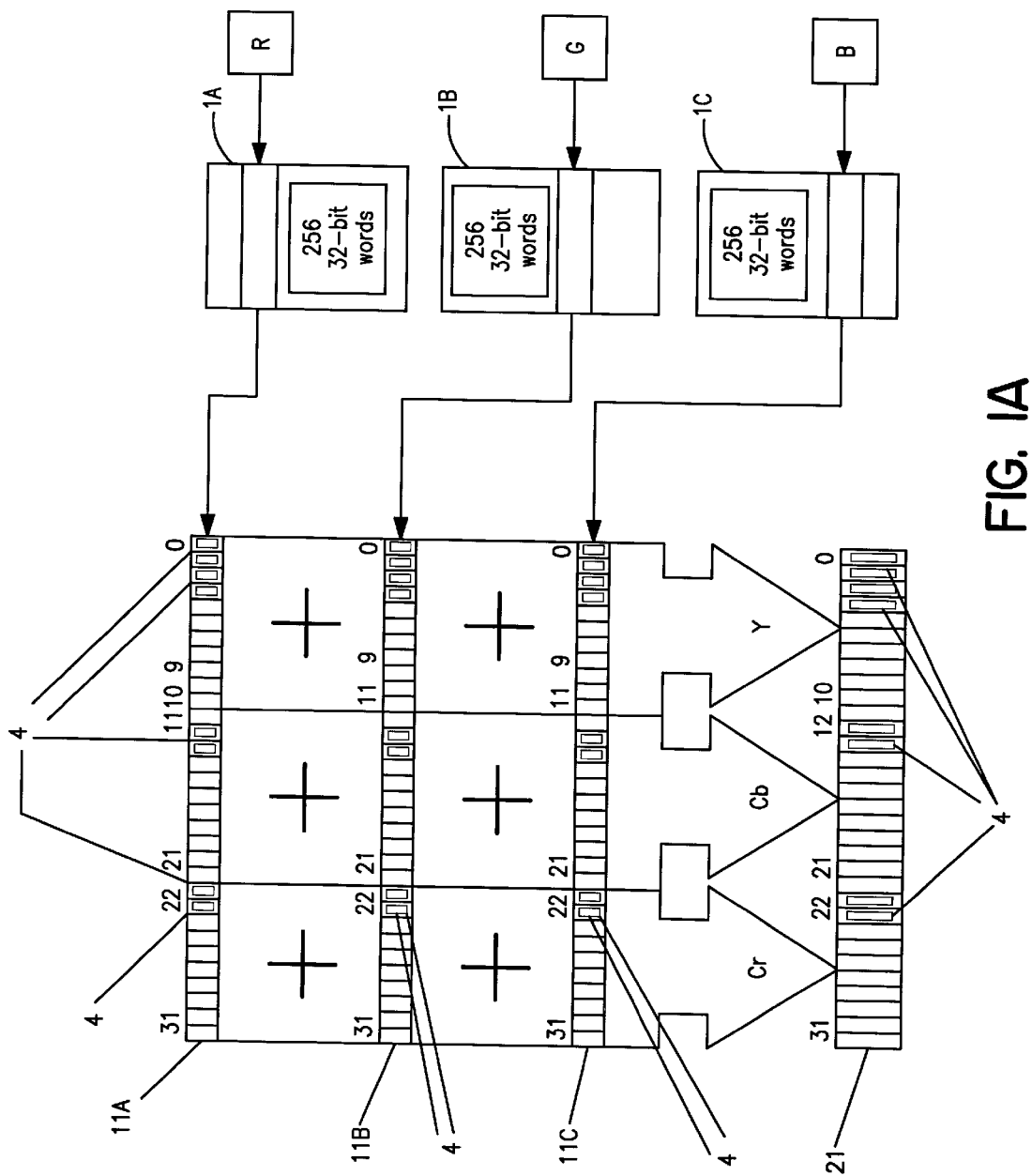
FIG. 1A schematically and partially represents the process for converting the representation of a video image from the RGB coding system to the YCbCr coding system, FIG. 1B schematically and partially represents an extraction step in the process for converting from the RGB coding system to the YCbCr coding system, FIG. 2A schematically and partially represents the process for converting the representation of a video image from the YCbCr coding system to the RGB coding system, FIG. 2B schematically and partially represents an extraction step in the process for converting from the YCbCr coding system to the RGB coding system.
Figure 1B:
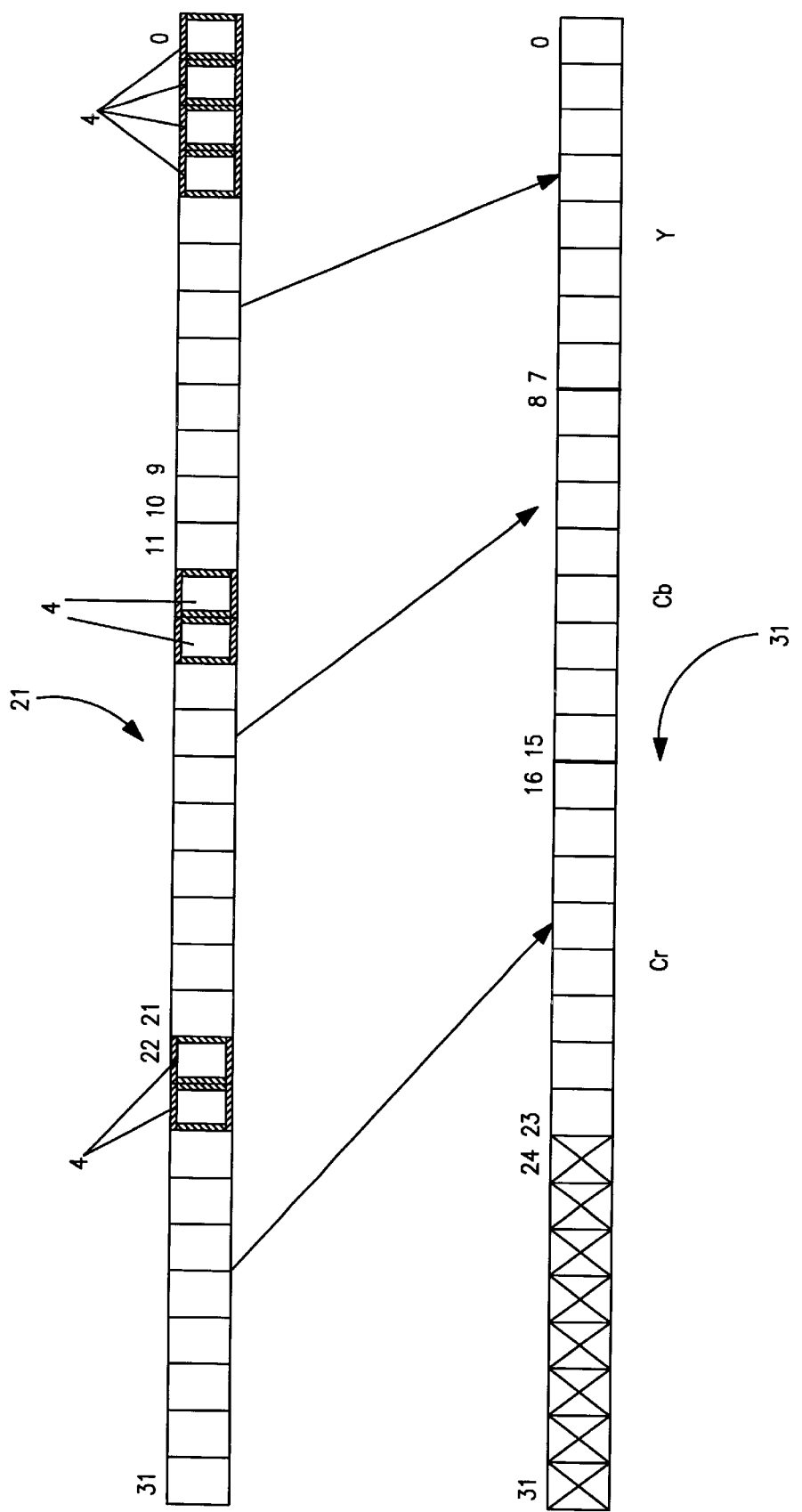

The invention will now be described in reference to FIGS. 1A and 1B. The process for converting the representation of a video image from a first coding system to a second coding system according to the invention is comprised of replacing the operations for the matrix conversion of the parameters of the image with a selection, for each parameter to be converted from the first coding system to the second, of a breakdown expressed as a function of the parameters of the second coding system. The breakdown represents the value of the parameter of the first coding system to be converted into the second coding system. Each breakdown comprises three ranges, representing each of the components of the value of the parameter in the second coding system. The breakdowns of each of the parameters to be converted are then added. The process according to the invention can include extractions of the values of the parameters constituting the breakdowns. Likewise, the process can include a step comprised of clipping the values of the parameters to be converted and/or the converted values that are outside the ranges of authorized values for these parameters. A non-limiting exemplary embodiment of the invention will now be described in terms of its application to the conversion of an image between the RGB and YCbCr standards.

With a scale factor, the matrix transformation that expresses the parameters (Y=luminance, Cr=difference between the red component and the luminance, Cb=difference between the blue component and the luminance) as a function of the parameters (R=red, G=green, B=blue) is expressed by the formula:

$$\begin{bmatrix} Y \\ Cb \\ Cr \end{bmatrix} = \begin{bmatrix} 16 \\ 128 \\ 128 \end{bmatrix} + \frac{1}{256} \times \begin{bmatrix} 65.738 & 129.057 & 25.064 \\ -37.945 & -74.494 & 112.439 \\ 112.439 & -94.154 & -18.285 \end{bmatrix} \times \begin{bmatrix} R \\ G \\ B \end{bmatrix}$$

This is equivalent to expressing the value of Y, for example, using the equation Y=65.738/256×R+129.057/256×G+25.064/256×B+16, 256 being a scale factor that corresponds to the fact that the parameters R, G and B have authorized or usable values that are between 0 and 255. The parameter Y has usable or authorized values that are between 16 and 235, while the parameters Cb and Cr have authorized or usable values that are between 16 and 240. The breakdowns are calculated with absolute precision and then rounded off, taking the precision bits into account. The process according to the invention is comprised, for each parameter to be converted from the first coding system (R, G, B) to the second coding system (Y, Cr, Cb), of selecting a breakdown (11A, 11B, 11C) of, for example, 32 bits, which expresses the value of a parameter of the first coding system (R, G, B) as a function of the parameters (Y, Cr, Cb) of the second coding system. Each breakdown represents the value of the parameter to be converted. Each breakdown (11A, 11B, 11C) in the parameters of the second coding system can be selected, for example, in a respective conversion table (1A, 1B, 1C) associated with the parameter in question. The breakdowns (11A, 11B, 11C) of the respective parameters (R, G, B) that constitute the respective conversion tables (1A, 1B, 1C) are expressed by the matrix transformation that expresses the parameters (Y, Cr, Cb) as a function of the parameters (R, G, B). Each breakdown (11A, 11B, 11C) can be composed of one word of for example, 32 bits. Each conversion table (1A, 1B, 1C) associated with a respective parameter to be converted (R, G, B) can comprise, for example 256 32-bit words or breakdowns corresponding to 256 possible values of the parameter to be converted. Thus, each breakdown (11A, 11B, 11C) of each parameter (R, G, B) to be converted is selected so as to be the one closest or equal to the value of the parameter to be converted. In the conversion table (1A) for the conversion of the parameters (R) into parameters (Y, Cr, Cb), the 32 bits of each breakdown can be divided so that a range 12 bits will represent the corresponding value of the parameter Y, a range of 10 bits will represent the corresponding value of the parameter Cb, and the remaining 10 bits will represent the corresponding value of the parameter Cr. Each conversion table (1B, 1C) for the conversion of the parameters (G, B, respectively) into parameters (Y, Cr, Cb) is constituted according to the same principle. The bit range (bits 12 through 21) representing the value of the parameter Cb is located between the bit ranges representing, respectively, the values of the parameters Y, which end with bit 11, and Cr which begins with bit 22 (FIG. 1A). The bit range representing the value of the parameter Y is constituted by the lowest-order bits 0 through 11 of the breakdown (bit 0 through bit 11, FIG. 1A). The bit range representing the value of the parameter Cr corresponds to the highest-order bits of the breakdown (bit 22 through bit 31 in FIG. 1A). The input parameters to be converted that are valid, i.e., the parameters within the ranges of authorized values, do not pose any overflow problem; in other words, for all the values between 0 and 255, the coefficients are chosen in such a way that the result never generates a carry. Thus, for the conversion RGB→YCbCr, Y is expressed by the formula in which all the values are positive, the sum of which is between 16 and 235, and is expressed in the following way:

$$Y = \left[\frac{65.738}{256} \times R\right] + \left[\frac{129.057}{256} \times G\right] + \left[\frac{25.064}{256} \times B + 16\right]$$

$$Cb = \left[-\frac{37.945}{256} \times R\right] + \left[-\frac{74.494}{256} \times G\right] + \left[\frac{112}{256} \times G + 128\right]$$

with 16≦240.

$$Cr = \left[\frac{112.439}{256} \times R\right] + \left[-\frac{94.154}{256} \times G\right] + \left[-\frac{18.285}{256} \times B + 128\right]$$

However, the negative values imply a carry which will disturb the next range located on the left. In the case of this conversion, it is possible to find a breakdown of the constant 128, for example into 48 for the term associated with R and 80 for the term associated with G, so that all the ranges will be strictly positive.

$$Cb = \left[ -\frac{37.945}{256} \times R + 48 \right] + \left[ -\frac{74.494}{256} \times G + 80 \right] + \left[ \frac{112.439}{256} \times B \right]$$

Likewise, for Cr, the constant 128 is broken down into 100 for the term associated with G and 28 for that associated with B.

$$Cr = \left[ \frac{112.439}{256} \times R \right] + \left[ -\frac{94.154}{256} \times G + 100 \right] + \left[ -\frac{18.285}{256} \times B + 28 \right]$$

Thus, with this breakdown of the constants, no separation bit or overflow bit is necessary.

Each bit range representing the value of a breakdown parameter can comprise up to 4 bits, for example two precision bits (4) constituting the two lowest-order bits of the bit range in question. Thus, the values of the parameters (Y, Cr, Cb) of the breakdowns are defined with a resolution of 10 bits during the conversion.

Each of the breakdowns (11A, 11B, 11C) of each of the parameters (R, G, B) to be converted are then added, and thus the bit ranges representing the same parameters (Y, Cr, Cb) are added to one another. The sum (21) of the breakdowns (11A, 11B, 11C) has the same format as the breakdowns. The conversion process according to the invention continues with a step comprised of extracting the bit ranges representing the values of the parameters (Y, Cr, Cb) near the lowest-order bits, in order to eliminate the precision bits (4). Thus, in order to express the final value of Y, the process selects the bits 4 through 11 of the sum and ignores the first four low-order bits. To express the component Cb, the process selects the bits 14 through 21 of the sum, and to express the component Cr, the program implementing the process selects the bits 24 through 31. The result (31) obtained is a 24-bit word wherein the bits 0 through 7 represent the parameter Y, the bits 8 through 15 represent the parameter Cb and the bits 16 through 23 represent the parameter Cb. In effect, the 8-bit format of the parameters (Y, Cr, Cb) is the format in which the coding can be used in networks of the "Internet" type. The conversion process can include a step comprised of clipping the values of the parameters to be converted (R, G, B) that are outside the corresponding ranges of authorized values. The clipping can be comprised of expanding the breakdown tables for outside values of the parameters to be converted and of calculating the value of the corresponding ranges from the clipped values. The clipping can be comprised of replacing the values that are lower than the lower limit of the range of values with the authorized lower limit value, and of replacing the values that are greater than the upper limit of the range of values with the upper limit value.

With a scale factor, the matrix transformation that expresses the parameters (R, G, B) as a function of the parameters (Y, Cr, Cb) is expressed by:

$$\begin{bmatrix} R \\ G \\ B \end{bmatrix} = \frac{1}{256} \times \begin{bmatrix} 298.082 & 0 & 408.583 \\ 298.082 & -100.291 & -208.120 \\ 298.082 & 516.411 & 0 \end{bmatrix} \times \begin{bmatrix} Y - 16 \\ Cb - 128 \\ Cr - 128 \end{bmatrix}$$

It is understood that the ranges of authorized values for these parameters are the same as those indicated above.

Figure 2A:
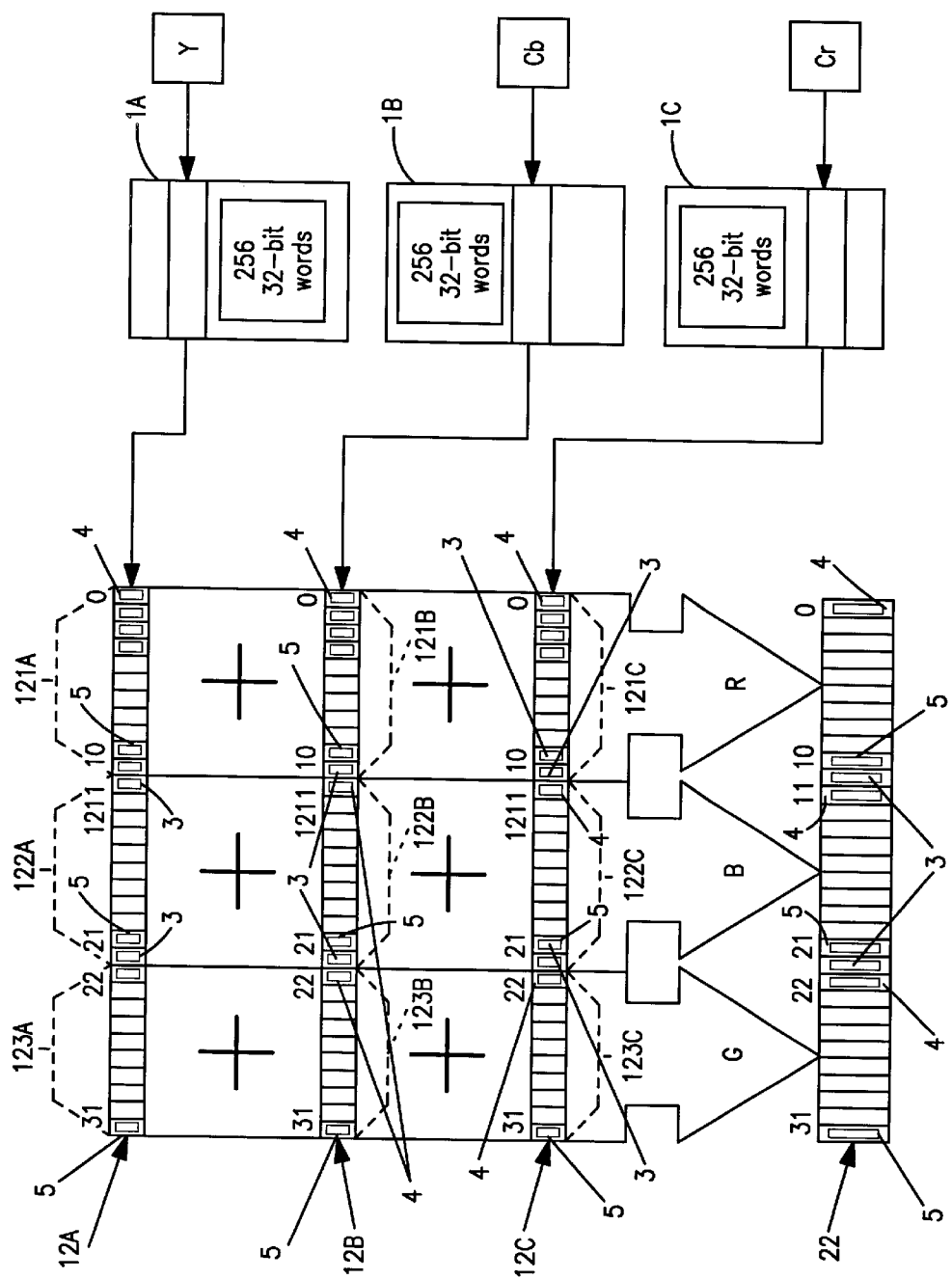
Figure 2B:
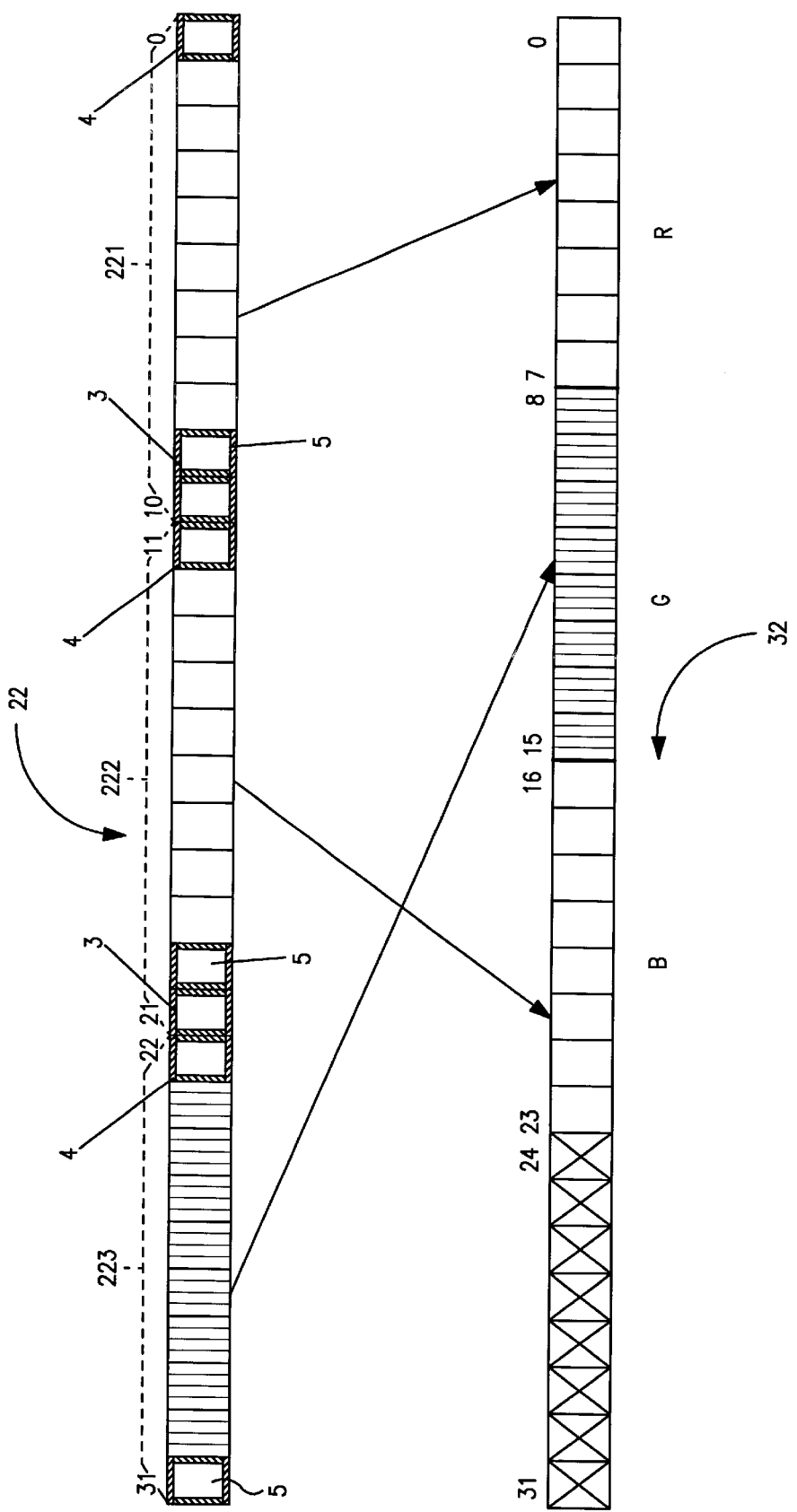

FIGS. 2A and 2B illustrate the conversion of the parameters (Y, Cr, Cb) into parameters (R, G, B). This conversion is essentially identical to that comprised of converting the parameters (R, G, B) into parameters (Y, Cr, Cb), which is described above in connection with FIGS. 1A and 1B. Thus, each of the parameters (Y), (Cr), or (Cb), respectively is expressed in a respective breakdown (12A, 12B, 12C) of 32 bits as a function of the parameters (R, G, B), which breakdown represents the value of the parameter in question (Y), (Cr), or (Cb), respectively. These breakdowns are selected in the selection tables (2A, 2B, 2C) associated with each of the parameters to be converted (Y), (Cr), and (Cb), respectively. The breakdowns (12A, 12B, 12C) of the parameters (Y, Cr, Cb), which are organized into conversion tables (2A, 2B, 2C) of 256 32-bit words, are expressed by the matrix transformation above that expresses the parameters (R, G, B) as a function of the parameters (Y, Cr, Cb). These tables can be the same size as the tables of FIG. 1A. For this conversion of the parameters (Y, Cr, Cb) into parameters (R, G, B), the 32 bits of each breakdown (12A, 12B, 12C) are divided so that a first range (121A, 121B, 121C) of 11 bits represents the value of the corresponding breakdown of the parameter R, a second range (122A, 122B, 122C) of 11 bits (bits 11 through 21) represents the corresponding breakdown of the parameter B, and the 10 remaining bits (bits 22 through 31) constituting a third range (123A, 123B, 123C) represent the corresponding value of the parameter G. The bit range representing the value of the parameter B is located, for example, between the bit ranges representing the values of the parameter R and G, respectively, and more precisely between the bits 11 and 21 (FIG. 1C). The bit range representing the value of the parameter R is constituted, for example, by the lowest-order bits of the breakdown (bit 0 through bit 10, FIG. 2A), and therefore the bit range representing the value of the parameter G constitutes the highest-order bits of the breakdown (bit 22 through bit 31, FIG. 2A). The highest-order bit of the first 11-bit range (121A), which represents the value of the parameter R, can be a carry bit (3) (bit 10, FIG. 2B) that is provided in order to constitute a protection against the propagation of the carry. Likewise, the highest-order bit of the second 11-bit range, which represents the value of the parameter B, can be a carry bit (3) (bit 21, FIG. 2B), which is also provided in order to constitute a protection against the propagation of the carry. These two carry bits (3) each constitute an isolation, respectively between the bit ranges of the parameters R and B and between the bit ranges of the parameters B and G. Thus, these carry bits, during the addition of the three breakdowns, prevent the value of the sum of the parts representing the parameter R from disturbing the lowest order bits of the range B and prevent the value of the parameter B from disturbing the lowest order bits of the parameter G. These two carry bits (3) are provided for the parameters R and B because, in the lines corresponding to the matrix for converting the parameters (R, G, B) into the parameters (R, Cr, Cb), only two coefficient values of the matrix are not null. Thus, only one protection bit (3) for preventing the propagation of the carry is necessary. For the bit range representing the parameter G, no carry bit is provided because the bit range representing G constitutes the highest-order bits of the 32-bit breakdown. Therefore, it does not pose any problem of propagating the carry for the parameter G. Placing the range G in the lower order would have required 2 carry bits. As before, the input parameters to be converted that are valid, i.e., the parameters within the authorized ranges, do not pose any overflow problem. Since the space YCbCr is more compact than the space RGB, there are existing combinations of values YCbCr that are illegal, even for values YCbCr belonging to the ranges of authorized values. These values, which cannot be obtained from the inverse conversion (RGB→YCbCr) cause an overflow, i.e. a result less than 0 or greater than 255. The ranges R, G, and B have an overflow bit located in high order between the carry bit and the highest-order bit of the result. By examining this bit, it is possible to determine the overflow and clip the result. Each bit range representing the value of a breakdown parameter can comprise, for example, a precision bit (4, FIG. 2B) constituting the lowest-order bit of the bit range in question. Thus, the values of the parameters (R, G, B) of the breakdowns are defined with a resolution of 9 bits during the conversion. In the same way as before, the breakdowns (12A, 12B, 12C) of all the parameters (R, G, B) to be converted are then added up, and thus the bit ranges representing the same parameters (R, G, B) are added to one another. The sum (22) of the breakdowns (12A, 12B, 12C) have the format of a 32-bit word in which the bits 10 and 21 are carry bits (3). The bit ranges representing the values of the parameters (R, G, B) are then shifted toward the lowest order bits (FIG. 2B), in order to eliminate the precision bits (4) the carry bits (3) and the overflow bits (5). Furthermore, during this shift operation, the bit ranges corresponding to the parameters (R, G, B) can be shifted so that the bit range representing the value of the parameter G will be located between the bit ranges representing the values of the parameters B and R, respectively. The bit range representing the value of the parameter R is constituted by the 8 low-order bits 1 through 8 of the sum (22) of the breakdowns and the bit range representing the value of the parameter B is constituted by the eight middle-order bits 12 through 19 of the sum (22) of the breakdowns. The bit range representing the value of the parameter G of the breakdown is constituted by the eight highest-order bits 23 through 30 of the sum. The result (32) obtained is a 24-bit word wherein the bits 0 through 7 represent the parameter R, the bits 8 through 15 represent the parameter G and the bits 16 through 23 represent the parameter B. The 8-bit format of the parameters (R, G, B) is the one that can be used, for example, for the "WINDOWS" operating system. Moreover, for values of YCbCr less than 0 or greater than 255, the conversion tables (2A, 2B, 2C) can be expanded in order to adapt the conversion process to excess coefficients.

Of course, the invention is not limited to the exemplary embodiment described above. In particular, the process can be applied to larger representations. Likewise, the order of the ranges chosen to illustrate the invention can be modified without going beyond the scope of the invention. Thus, for example, the formats of the conversion tables and the breakdowns of the parameters can be different from those described above, without going beyond the scope of the invention. It is possible, for example, to provide larger conversion tables that make it possible to process long, signed values, but to the detriment of memory consumption.

Thus, it is clear the process for converting the representation of a video image from a first coding system to second coding system reduces the number of processing operations during the conversion of the image, thus saving machine time.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the spirit and scope of the invention as set forth herein and defined in the claims.

What is claimed is:

1. A process for converting the representation of a video image between two coding systems with the aid of two respective sets of parameters, in which each set of parameters is deduced from the other by means of a matrix transformation, comprising the steps of:

selecting, for each parameter in the set to be converted from a first coding system to a second coding system, a breakdown (11A, 11B, 11C; 12A, 12B, 12C) in the parameters of the second coding system representing the value of the parameter in the matrix transformation, and adding the breakdowns of each of the parameters to be converted, the breakdowns (11A, 11B, 11C; 12A, 12B, 12C) in the parameters of the second coding system being constituted by words having the same bit size, the values of the parameters of the second coding system of the breakdown being located in adjacent bit ranges and being separated by at least one protection bit (3) for preventing the propagation of the carry resulting from the breakdown and/or the additions.

2. A process for converting the representation of a video image between two coding systems according to claim 1, characterized in that each of the parameters of the two coding systems have ranges of authorized values, the conversion process further including a step comprising clipping values of the parameters to be converted and/or values of the converted parameters that are outside the corresponding ranges of values.

3. The process for converting the representation of a video image between two coding systems according to claim 2, comprising selecting each breakdown (11A, 11B, 11C; 12A, 12B, 12C) in the parameters of the second coding system by addressing the parameter in question in a stored conversion table (1A, 1B, 1C; 2A, 2B, 2C) with the aid of an input value.

4. The process for converting the representation of a video image between two coding systems according to claim 1, further including shifting and reorganizing the result derived from adding the breakdown of each of the parameters.

5. The process for converting the representation of a video image between two coding systems according to claim 1, characterized in that the values of the parameters of the second coding system of the breakdown have bit sizes greater than the sizes of the coded values at the end of the conversion, both in the low-order bits for increasing precision of the calculations and in the high-order bits for accommodating overflows, the step comprised of adding the breakdowns of each of the parameters to be converted being followed by a step comprised of extracting the bit ranges representing the values of the parameters of the second coding system, in order to eliminate the precision bits (4), the carry bits (3) and the overflow bits (5).

6. The process for converting the representation of a video image between two coding systems according to claim 1, wherein the process converts an image from an RGB standard to a YCbCr standard and vice versa.

7. The process for converting the representation of a video image between two coding systems according to claim 2, characterized in that it comprises a step for clipping the values of the parameters of the breakdown constituting the converted parameter, the clipping step comprising replacing the values lower than the lower limit of the range of authorized values with a lower limit value, and of replacing values higher than an upper limit of the range of authorized values with an upper limit value.

8. The process for converting the representation of a video image between two coding systems according to claim 7, characterized in that the clipping step is carried out directly in the conversion tables (1A, 1B, 1C; 2A, 2B, 2C).

9. The process for converting the representation of a video image between two coding systems according to claim 8, wherein the clipping step is carried out directly by a program.

10. The process for converting the representation of a video image between two coding systems according to claim 6, characterized in that the clipping step is carried out in conversion tables (1A, 1B, 1C; 2A, 2B, 2C) and each breakdown (11A, 11B, 11C; 12A, 12B, 12C) is constituted by a 32-bit word, each conversion table associated with a parameter to be converted (R, G, B), respectively (Y, Cr, Cb) comprising at least 256 words or breakdowns corresponding to the possible values of the parameters to be converted.

11. The process for converting the representation of a video image between two coding systems according to claim 7, characterized in that the clipping is carried out in conversion tables (1A, 1B, 1C; 2A, 2B, 2C) and each breakdown (11A, 11B, 11C; 12A, 12B, 12C) is constituted by a 32-bit word, each conversion table associated with a parameter to be converted (R, G, B), respectively (Y, Cr, Cb) comprising at least 256 words or breakdowns corresponding to the possible values of the parameters to be converted.

12. The process for converting the representation of a video image between two coding systems according to claim 8, characterized in that each breakdown (11A, 11B, 11C; 12A, 12B, 12C) is constituted by a 32-bit word, each conversion table associated with a parameter to be converted (R, G, B), respectively (Y, Cr, Cb) comprising at least 256 words or breakdowns corresponding to the possible values of the parameters to be converted.

13. The process for converting the representation of a video image between two coding systems according to claim 10, characterized in that, for the conversion of the parameters (R, G, B) into parameters (Y, Cr, Cb), the breakdowns of the parameters (R, G, B) each comprise a first range of N1 bits representing the corresponding value of the parameter Y or luminance, a second range of N2 bits representing the corresponding value of the parameter Cb, or the difference between the luminance and the blue chrominance, and a third range of N3 bits representing the corresponding value of the parameter Cr, or the difference between the luminance and the red chrominance.

14. The process for converting the representation of a video image between two coding systems according to claim 13, characterized in that all of the ranges comprise supplementary bits for increasing precision.

15. The process for converting the representation of a video image between two coding systems according to claim 10, characterized in that, for the conversion of the parameters (Y, Cr, Cb) into parameters (R, G, B), the breakdowns of the parameters (Y, Cr, Cb) comprise a range of M1 bits representing the corresponding value of the parameter R, or the color red, a range of M2 bits representing the corresponding value of the parameter B, or the color blue, and a range of M3 bits representing the corresponding value of the parameter G, or the color green, each of the ranges of bits representing values of parameters R and B comprising 1 bit provided for protection against the propagation of the carry, all of the ranges having at least one bit for increasing precision and one overflow bit.

16. The process for converting the representation of a video image between two coding systems according to claim 11, characterized in that, for the conversion of the parameters (Y, Cr, Cb) into parameters (R, G, B), the breakdowns of the parameters (Y, Cr, Cb) comprise a range of M1 bits representing the corresponding value of the parameter R, or the color red, a range of M2 bits representing the corresponding value of the parameter B, or the color blue, and a range of M3 bits representing the corresponding value of the parameter G, or the color green, each of the ranges of bits representing values of parameters R and B comprising 1 bit provided for protection against the propagation of the carry, all of the ranges having at least one bit for increasing precision and one overflow bit.

17. The process for converting the representation of a video image between two coding systems according to claim 12, characterized in that, for the conversion of the parameters (Y, Cr, Cb) into parameters (R, G, B), the breakdowns of the parameters (Y, Cr, Cb) comprise a range of M1 bits representing the corresponding value of the parameter R, or the color red, a range of M2 bits representing the corresponding value of the parameter B, or the color blue, and a range of M3 bits representing the corresponding value of the parameter G, or the color green, each of the ranges of bits representing values of parameters R and B comprising 1 bit provided for protection against the propagation of the carry, all of the ranges having at least one bit for increasing precision and one overflow bit.

18. The process for converting the representation of a video image between two coding systems according to claim 2, characterized in that the values of the parameters of the second coding system of the breakdown have bit sizes greater than the sizes of the coded values at the end of the conversion, both in the low-order bits for increasing precision of the calculations and in the high-order bits for accommodating overflows, the step comprised of adding the breakdowns of each of the parameters to be converted being followed by a step comprised of extracting the bit ranges representing the values of the parameters of the second coding system, in order to eliminate the precision bits (4), the carry bits (3) and the overflow bits (5).

19. The process for converting the representation of a video image between two coding systems according to claim 3, characterized in that the values of the parameters of the second coding system of the breakdown have bit sizes greater than the sizes of the coded values at the end of the conversion, both in the low-order bits for increasing precision of the calculations and in the high-order bits for accommodating overflows, the step comprised of adding the breakdowns of each of the parameters to be converted being followed by a step comprised of extracting the bit ranges representing the values of the parameters of the second coding system, in order to eliminate the precision bits (4), the carry bits (3) and the overflow bits (5).

20. The process for converting the representation of a video image between two coding systems according to claim 4, characterized in that the values of the parameters of the second coding system of the breakdown have bit sizes greater than the sizes of the coded values at the end of the conversion, both in the low-order bits for increasing precision of the calculations and in the high-order bits for accommodating overflows, the step comprised of adding the breakdowns of each of the parameters to be converted being followed by a step comprised of extracting the bit ranges representing the values of the parameters of the second coding system, in order to eliminate the precision bits (4), the carry bits (3) and the overflow bits (5).

21. The process for converting the representation of a video image between two coding systems according to claim 6, wherein the matrix transformation that expresses parameters from the YcbCr standard as a function of parameters from the RGB standard is expressed by the formula:

$$\begin{bmatrix} Y \\ Cb \\ Cr \end{bmatrix} = \begin{bmatrix} 16 \\ 128 \\ 128 \end{bmatrix} + \begin{bmatrix} \frac{1}{256} \end{bmatrix} \times \begin{bmatrix} 65.738 & 129.057 & 25.064 \\ -37.945 & -74.494 & 112.439 \\ 112.439 & -94.154 & -18.285 \end{bmatrix} \times \begin{bmatrix} R \\ G \\ B \end{bmatrix}.$$

22. The process for converting the representation of a video image between two coding systems according to claim 6, wherein the matrix transformation that expresses parameters from the RGB standard as a function of parameters from the YcbCr standard is expressed by the formula:

$$\begin{bmatrix} R \\ G \\ B \end{bmatrix} = \begin{bmatrix} \frac{1}{256} \end{bmatrix} \times \begin{bmatrix} 298.082 & 0 & 408.583 \\ 298.082 & -100.291 & -208.120 \\ 298.082 & 516.411 & 0 \end{bmatrix} \times \begin{bmatrix} Y - 16 \\ Cb - 128 \\ Cr - 128 \end{bmatrix}.$$

* * * * *

UNITED STATES PATENT AND TRADEMARK OFFICE
CERTIFICATE OF CORRECTION

PATENT NO.    : 6,323,872 B1                                    Page 1 of 1
DATED         : November 27, 2001
INVENTOR(S)   : Wozniak It is certified that error appears in the above-identified patent and that said Letters Patent is hereby corrected as shown below:

<u>Title page,</u>
Item [73], Assignees, before "Chesnay,", insert -- Le --;

Signed and Sealed this

Third Day of December, 2002

JAMES E. ROGAN
*Director of the United States Patent and Trademark Office*